W. H. JONES.
HEATER.
APPLICATION FILED MAY 21, 1910.

1,040,688.

Patented Oct. 8, 1912.

Witnesses:
Robert N. Weir
Robert H. Dobberman

Inventor:
William H. Jones
By Rector, Hibben, Davis & Macauley
His Attys.

UNITED STATES PATENT OFFICE.

WILLIAM H. JONES, OF CHICAGO, ILLINOIS.

HEATER.

1,040,688.   Specification of Letters Patent.   Patented Oct. 8, 1912.

Application filed May 21, 1910. Serial No. 562,670.

*To all whom it may concern:*

Be it known that I, WILLIAM H. JONES, a citizen of the United States, residing at Chicago, Cook county, Illinois, have invented certain new and useful Improvements in Heaters, of which the following is a description, reference being had to the accompanying drawing, forming a part of this specification.

My invention relates to a combined house-heating and water-heating apparatus, comprising a main heater having circulating connections with the radiating apparatus of a house-heating system and a supplemental or auxiliary heater having its heating chamber arranged in heat-conductive relation with the heating chamber or passages of such main heater, and connected with a hot water tank to maintain a supply of hot water which may be piped to such fixture as desired.

The object of my invention is to provide a simple and economical arrangement of the two heaters whereby the main heater will, under ordinary conditions, serve to supply heat both to the house-heating system and the connections associated with the hot water tank, but in which if desired the auxiliary heater may be used to increase the amount of heat supplied to such systems, and in which, also, the auxiliary or tank heater may be used alone for the purpose of keeping up a supply of hot water in the tank, and at the same time, if desired, maintaining a circulation of mildly heated water through the circulating system associated with the main heater.

I have illustrated one form or embodiment of my invention in the accompanying drawings, in which—

Figure 1:
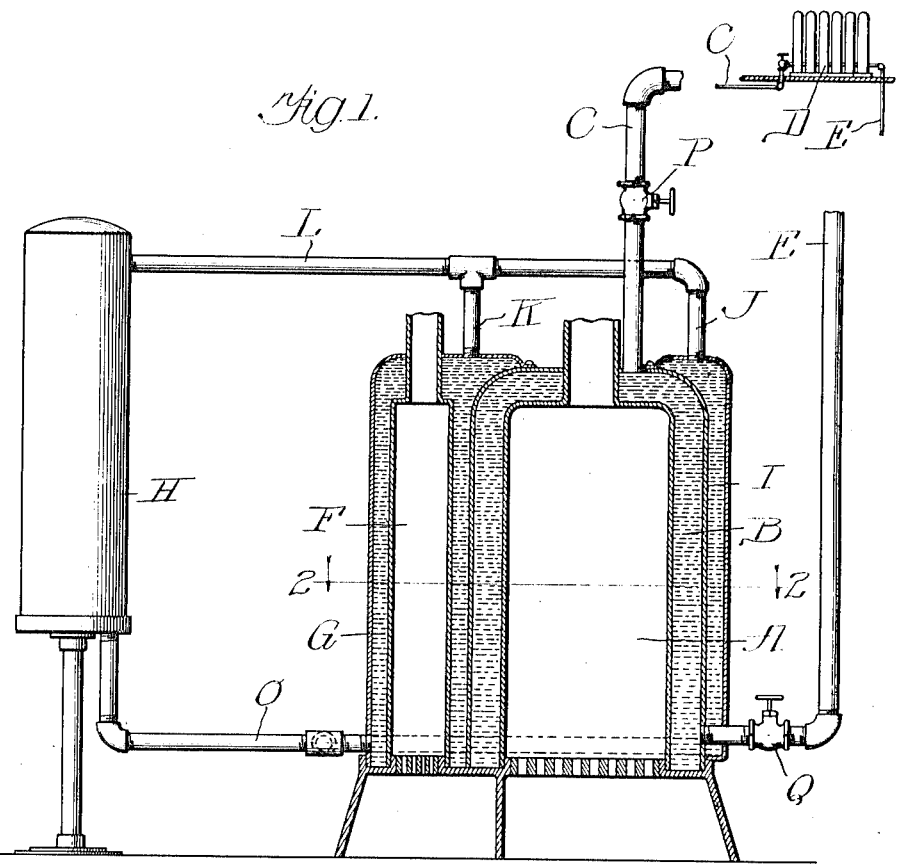
Figure 3:
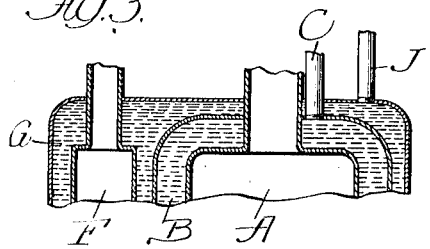
Figure 2:
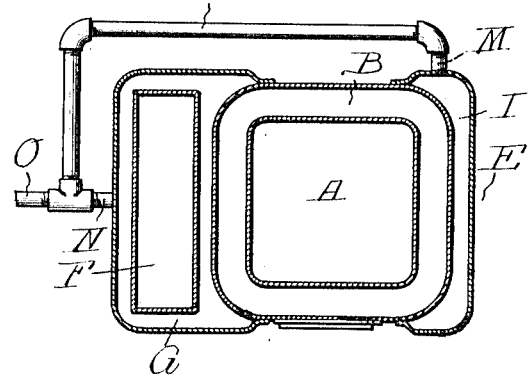
Figure 4:
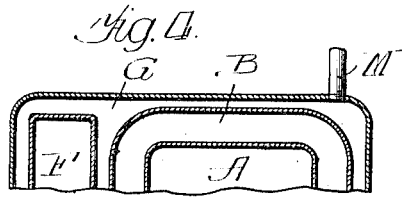

Figure 1 represents a vertical section of my heater on the line 1—1 of Fig. 2, the tank and pipe connections being shown in elevation; Fig. 2 a horizontal section of the heater on the line 2—2 of Fig. 1; and Figs. 3 and 4 fragmentary sections of a modified construction.

The main heater of my apparatus as illustrated is provided with the usual ash-pit, grate, and a combustion chamber A, in the present instance approximately square in cross-section, surrounded by a water chamber or jacket B, which at the top is connected with the outlet pipe C, leading to the radiating apparatus D in the building which is heated by it, and at the bottom is connected with the return pipe E through which the cooled water is conveyed back after passing through such radiating apparatus. The auxiliary or tank heater is likewise provided with an ash-pit, grate and a combustion chamber F, in the present instance of an oblong shape in cross-section, surrounded by a water jacket G, one side of which is in heat-conductive relation to the water chamber B of the main heater. On the opposite side of the main heater from the tank heater I preferably employ, for the purpose of obtaining a greater amount of heating space for heating the water in the tank H, a water chamber I, this water chamber and the water jacket of the tank heater being respectively connected at their top portions with the branches J and K of the hot water outlet L leading to the tank, and at their lower portions connected with the branches M and N of the return or cold water pipe O, it being understood that the tank is provided with the usual service connections to mains furnishing a supply of water under pressure, and also with pipes for distributing the hot water to whatever fixtures it is designed to furnish with hot water.

It will be noted that whether the main heater be used alone or the tank heater alone, the amount of water-heating space communicating with the tank is practically the same, the space being equalized or balanced on opposite sides of the heater which at the time is used, in either case.

As shown in Fig. 1, the main heater, the tank heater on one side of it, and the water heating chamber on the other, are arranged to together form a compact rectangular structure. The outer top wall of the water chamber G, and the outer top wall of the water chamber I in the present instance, and preferably, extend inwardly over a portion of the outer top wall of the water jacket B of the main heater for the purpose of obtaining a greater heating effect therefrom. If desired, the water chambers G and I may extend, both at the back of the main heater and over its top, to communicate with each other, (see Figs. 3 and 4) the back and top walls of such chambers in such case forming respectively single continuous walls at the back and over the top of the main heater, and the outlet pipe C of the main heater being carried through the outer water chamber to the water chamber B.

A cut-off valve P is interposed in the outlet pipe C of the main heater, and a drain cock Q is provided in the return pipe E for draining the water from the chamber B and communicating passages when desired.

It is evident that in moderate weather the main heater of a combined house-heating and water-heating apparatus constructed as above described may be used to both heat a building and keep up a supply of hot water in a tank, while in more severe weather the tank heater may be used as an auxiliary to the main heater. In mild weather a fire is kept up in the combustion chamber of the auxiliary heater only, the valve P being closed when it is desired to heat only the water in the tank, and opened at times when it is desired to secure a mild heating effect from the radiating apparatus of the house-heating system associated with the main heater, the heat of the water in the chamber G of the tank heater in such case inducing a secondary circulation in the passages of the house-heating system. When the valve P is closed the water in the chamber or water jacket B is "dead," and practically serves as a non-conductor, preventing loss of heat through the wall separating such chamber from the chamber G of the tank heater.

By the use of two heaters of different capacities, combined and associated as described, I obtain a heating apparatus having a wider range of capacity and utility than any heretofore known.

While I have shown my combined house-heating and water-heating apparatus as constructed with a single sheet or thickness of metal intermediate the water chambers B and G, and B and I, the front and rear walls of the tank heater and the chamber I being riveted to the front and rear walls of the main heater, it will be understood that the tank heater may be constructed with an independent inside wall making a complete inclosure of the water jacket or chamber G, and the water chamber I constructed in like manner, and the separate portions bolted or otherwise secured together in contact in heat-conductive relation in any suitable manner. It will also be understood that while I have shown and described a main heater adapted for heating a building through the circulation of hot water, my invention may be applied to a heater having a boiler and adapted to operate by means of the circulation of steam through proper radiating apparatus. It will be also understood that while for convenience in describing and claiming my invention I have described the main heater as connected to house-heating apparatus, and the auxiliary heater as connected to a hot water tank, the particular kind of radiating apparatus or purpose for which it is employed is immaterial, and the outlet and return connections of what I have termed the tank heater may be connected to radiating apparatus of any suitable kind for any purpose to which it may be adapted.

What is claimed is:

1. Heating apparatus comprising a combustion chamber, a water-heating chamber arranged to be heated by said combustion chamber, a second combustion chamber, a second water-heating chamber arranged in effective heat-conductive relation to produce secondary heating effect with said first mentioned water-heating chamber and arranged to be independently heated by said second combustion chamber, and independent circulating system and connections in communication respectively with said two water-heating chambers.

2. The combination of a main heater provided with a combustion chamber and a heating chamber, a tank heater arranged at one side of said main heater and provided with a combustion chamber and a water chamber having a wall in effective heat-conductive relation to produce secondary heating effect with the adjacent side of the heating chamber of the main heater, and independent circulating systems connected respectively with the heating chamber of said main heater and the water chamber of said tank heater.

3. The combination of a four-sided main heater provided with a combustion chamber and a heating chamber, and a tank heater arranged at one side of said main heater and provided with a separate combustion chamber and a separate chamber for heating water arranged in heat-conductive relation with the adjacent side of the heating chamber of said main heater, the top of said water chamber extending over the top portion of said main heater.

4. The combination of a four-sided main heater provided with a combustion chamber and a heating chamber, and at one side thereof of an outer-water-heating chamber in heat-conductive relation with said heating chamber, and a tank heater arranged at the opposite side of said main heater and provided with a separate combustion chamber and a separate chamber for heating water having the wall adjacent said heating chamber of said main heater arranged in heat-conductive relation with said heating chamber, the top of said water chamber of the tank heater and the top of said outer water heating chamber of the main heater extending inwardly over the top of the heating chamber of said main heater.

5. The combination of a main heater provided with a combustion chamber and a heating chamber, and at one side thereof an outer water-heating chamber in heat-conductive relation with said heating chamber, and a tank heater arranged at the opposite side of said main heater and provided with a separate combustion chamber and a separate water-heating chamber, which latter is arranged adjacent and in heat-conductive relation with the heating chamber of the main heater.

6. The combination of two heaters, each provided with a separate combustion chamber and with a separate heating chamber, said combustion chambers being of different heating capacities, and said heating chambers being arranged in heat-conductive relation to each other, effective to produce secondary heating effect, and two independent circulating systems connected respectively with the heating chambers of the two heaters.

7. In combination with a main heater having a combustion chamber and a heating chamber surrounding the combustion chamber, a tank heater comprising a separate water-heating chamber at the side of and in effective heat-conductive relation to produce secondary heating effect with the heating chamber of the main heater, a separate combustion chamber, and circulating connections.

8. A heater comprising a plurality of separate non-communicating water-heating chambers arranged in heat-conductive relation to each other effective to produce secondary heating effect, and a like plurality of combustion chambers for respectively heating such water-heating chambers.

9. A heater comprising a combustion chamber, a water-heating chamber arranged to be heated by said combustion chamber, a second separate water-heating chamber adjacent to and in effective heat-conductive relation to produce secondary heating effect with said first mentioned water-heating chamber, and a second combustion chamber for independently heating said second mentioned heating chamber.

10. A heater comprising a combustion chamber, a heating chamber substantially surrounding said combustion chamber, a second combustion chamber, a second independent heating chamber substantially surrounding said last mentioned combustion chamber and having a wall in effective heat-conductive relation to produce secondary heating effect with said first mentioned heating chamber.

11. A heater comprising a combustion chamber, a water-heating chamber arranged to be heated by said combustion chamber, a second non-communicating water-heating chamber arranged at one side of and having a dividing wall in common with said first-mentioned water-heating chamber and in effective heat-conductive relation to produce secondary heating effect, and a second combustion chamber for independently heating said second water-heating chamber.

12. A heater comprising two separate non-communicating water-heating chambers arranged in heat-conductive relation to each other effective to produce secondary heating effect, and two combustion chambers for respectively heating such water-heating chambers, the associated pairs of combustion chambers being of different heating capacities.

WILLIAM H. JONES.

Witnesses:
Louis B. Erwin,
Robert H. Dobbenman.